(12) United States Patent
Ranganathan et al.

(10) Patent No.: US 9,111,173 B2
(45) Date of Patent: Aug. 18, 2015

(54) LEARNING PART-BASED MODELS OF OBJECTS

(75) Inventors: Ananth Ranganathan, Mountain View, CA (US); Roozbeh Mottaghi, Los Angeles, CA (US)

(73) Assignee: Honda Motor Co., Ltd., Tokyo (JP)

( * ) Notice: Subject to any disclaimer, the term of this patent is extended or adjusted under 35 U.S.C. 154(b) by 442 days.

(21) Appl. No.: 13/453,571

(22) Filed: Apr. 23, 2012

(65) Prior Publication Data

US 2013/0279800 A1 Oct. 24, 2013

(51) Int. Cl.
*G06K 9/46* (2006.01)

(52) U.S. Cl.
CPC .............. *G06K 9/4676* (2013.01); *G06K 9/469* (2013.01)

(58) Field of Classification Search
None
See application file for complete search history.

(56) References Cited

U.S. PATENT DOCUMENTS

| | | | |
|---|---|---|---|
| 7,239,929 B2 | 7/2007 | Ulrich | |
| 7,903,883 B2 | 3/2011 | Zitnick, III | |
| 2009/0034791 A1* | 2/2009 | Doretto et al. | 382/103 |
| 2010/0061591 A1 | 3/2010 | Okada et al. | |
| 2011/0064303 A1 | 3/2011 | Winn et al. | |

OTHER PUBLICATIONS

Li, Zisheng et al. "Facial-component-based Bag of Words and PHOG Descriptor for Facial Expression Recognition," IEEE International Conference on Systems, Man, and Cybernetics, Oct. 2009, 6 pages.*

Weber, M. et al. "Unsupervised Learning of Models for Recognition," ECCV 2000 Lecture Notes in Computer Science, vol. 1842, 2000, 15 pages.*

Niebles, Juan Carlos "A Hierarchical Model of Shape and Appearance for HUman Action Classification," IEEE Conference on Computer Vision and Pattern Recognition, 2007, Jun. 17, 2007, 9 pages.*

Shotton, Jamie et al. "TextonBoost: Joint Appearance, Shape and Context Modeling for Multi-class Object Recognition and Segmentation," ECCV 2006 Lecture Notes in Computer Science, vol. 3951, 2006, 15 pages.*

Mottaghi, Roozbeh. Ranganathan, Ananth. Yuille, Alan. "A Compositional Approach to Learning Part-based Models of Objects," 2011 IEEE Conference on Computer Vision Workshops, Nov. 6, 2011, 10 pages.*

Bosch, A. et al., "Image Classification using Random Forests and Ferns," Prof of the Int'l Conf. on Computer Vision, IEEE, 2007, 8 pages.

Dalal, N. et al., "Histograms of Oriented Gradients for Human Detection," 2005 IEEE Conference on Computer Vision and Pattern Recognition (CVPR'05), 2005, 8 pages.

(Continued)

*Primary Examiner* — Atiba O Fitzpatrick
*Assistant Examiner* — Ryan P Potts
(74) *Attorney, Agent, or Firm* — Fenwick & West LLP

(57) ABSTRACT

A system and method are provided for learning part-based object models during a learning phase from training images and applying the learned object models to an input image during runtime. The learned part-based object models are augmented by appearance-based models of the objects. The part-based object models correspond to the shapes of the parts of an object. The appearance-based models provide additional appearance cues to the object models for object classification. The approach to learning part-based object models has the capability of learning object models without using viewpoint labels of the objects. The learning is also invariant to scale and in-plane rotation of the objects.

26 Claims, 7 Drawing Sheets

(56) References Cited

OTHER PUBLICATIONS

Felzenszwalb, P.F. et al., "Object Detection with Discriminatively Trained Part Based Models," IEEE Transactions on Pattern Analysis and Machine Intelligence, Sep. 2010, pp. 1627-1645, vol. 32, No. 9.

Fergus, R. et al., "Object Class Recognition by Unsupervised Scale-Invariant Learning," 2003 IEEE Computer Society Conference on Computer Vision and Pattern Recognition, Jun. 18-20, 2003, 8 pages.

Zhu, L. et al., "Part and Appearance Sharing: Recursive Compositional Models for Multi-view Multi-object Detection," CVPR, IEEE, 2010, pp. 1919-1926.

* cited by examiner

LEARNING PART-BASED MODELS OF OBJECTS

FIELD OF THE INVENTION

The invention relates generally to objects classification in digital image processing systems, and in particular to learning part-based models for object detection and classification.

BACKGROUND OF THE INVENTION

One of the key challenges in computer vision is to detect and classify objects in digital images. It is difficult to detect and classify objects in digital images because (i) there can be considerable variation in the appearance of objects from a same object category (e.g., motorbikes can have different shapes, colors, and textures), (ii) objects can be seen from many different viewpoints and at different scales, and (iii) objects are often surrounded by cluttered backgrounds which makes object detection difficult.

One of existing object classification systems is to learn a codebook of object features and use the codebook for recognition of new instances of objects. Examples of codebook based object detection include an unsupervised generative model for configurations of the codebook words of objects, a shape model to specify where a codebook entry may appear on an object or combination of different detectors and descriptors with a classifier for object detection. However, the object features detected by the existing object classification systems are sparse, which only generate a sparse set of object objects.

Furthermore, existing object classification systems face a variety of other challenges including the requirement of specifying the number of parts during the learning of object models or using motion cues from video sequences. The existing object classification systems have the disadvantage of not being able to generalize and are also computationally expensive for processing digital images having significant scale and viewpoint changes of objects in the images.

Figure 1:
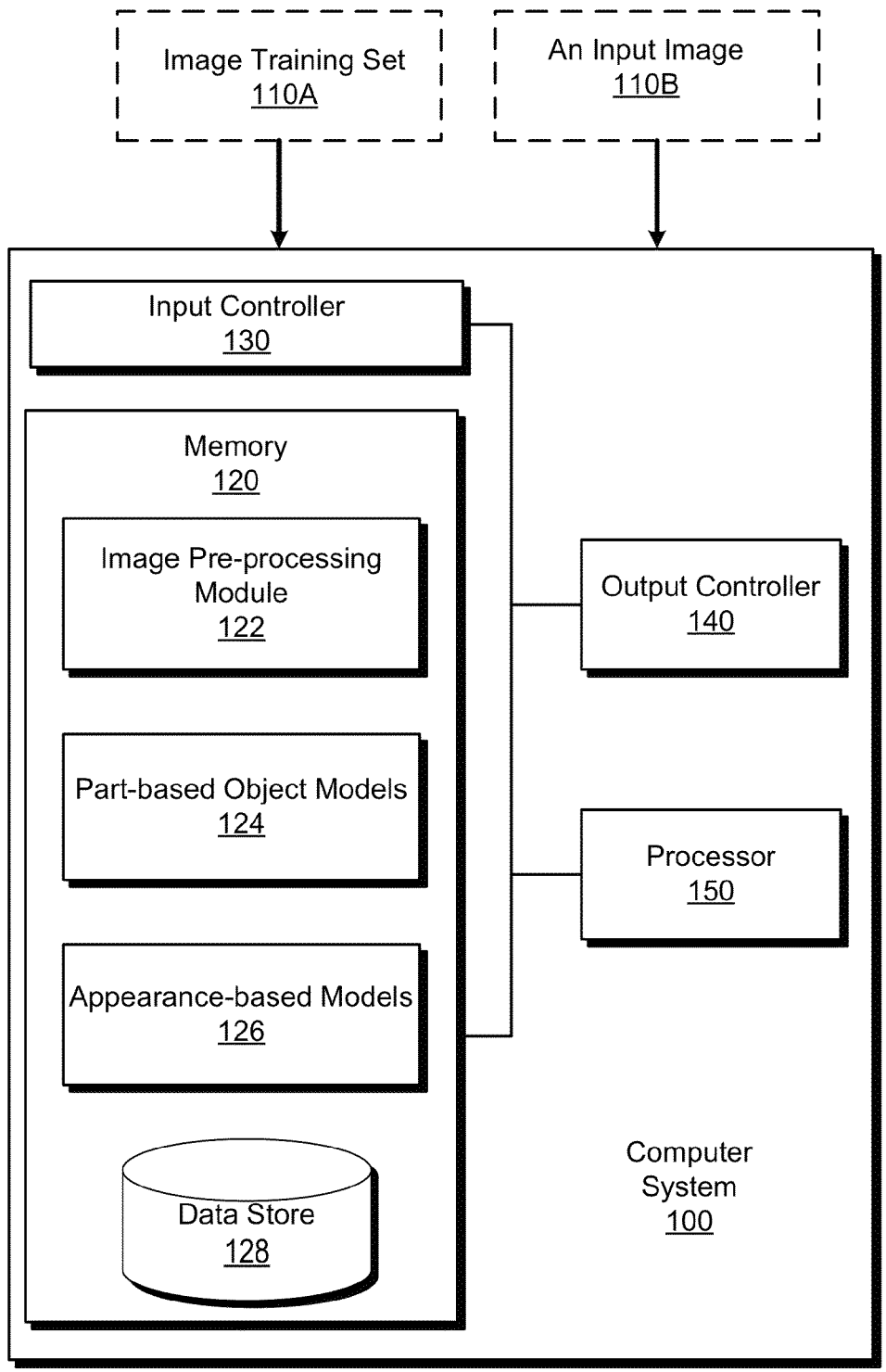
FIG. 1 illustrates a computer system for learning and applying part-based object models according to one embodiment of the invention.

The figures depict various embodiments of the invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

An embodiment of the invention is now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the invention include process steps and instructions described herein in the form of an algorithm. It should be noted that the process steps and instructions of the invention could be embodied in software, firmware or hardware, and when embodied in software, could be downloaded to reside on and be operated from different platforms used by a variety of operating systems.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus.

Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the invention is not described with reference to any particular programming language. It will be appreciated that a variety of programming languages may be used to implement the teachings of the invention as described herein, and any references below to specific languages are provided for disclosure of enablement and best mode of the invention.

In addition, the language used in the specification has been principally selected for readability and instructional purposes, and may not have been selected to delineate or circumscribe the inventive subject matter. Accordingly, the disclosure of the invention is intended to be illustrative, but not limiting, of the scope of the invention, which is set forth in the claims.

Embodiments of the invention provide a solution to the object classification problem based on learning part-based models for objects in a variety of object categories. One embodiment of a disclosed system includes a part-based object module for learning part-based object models from a set of digital representations of images. The system receives a set of training images, each of which has at least one object. For each image, the system extract extracts one or more shape features from the image and generate one or more shape models (e.g., histograms of gradients (HOG) bundles), where a shape model corresponds to a part of the object contained in the image. The system also computes an appearance model for each shape model based on the appearance features of the image. For each object in the image, the system selects one or more shape models and appearance models as reference shape models and appearance models of the object.

One embodiment of a disclosed system also includes an inference module for classifying an object in an input image. The system receives one or more reference shape models and appearance models learned from training images. The system generates one or more shape models of the object in the input image based on shape features extracted from the image and compares the generated shape models with the reference shape models. Based on the comparison, the system selects one or more candidate shape models of the object. The system further augments each candidate shape model with a corresponding appearance model of the object and determines the classification of the object based on the augmented candidate shape models.

System Overview

A solution to the object classification problem described above is based on learning part-based models for objects in a variety of object categories. The learned part-based object models are augmented by appearance-based models of the objects. The learning proceeds by building part-based models by combining elementary components of objects, which can be seen as a type of breadth first search in the space of object models. The learned part-based object models are generative (for image features), which enable the learning process to use predetermined model selection criteria. The learning process uses limited number of positive examples of each object category and is supervised based on the knowledge of the object labels and bounding box of the pre-labeled objects during learning. The learning part-based object models has the capability of learning object models without using viewpoint labels of the objects. The learning is also invariant to scale and in-plane rotation of the objects.

The part-based object models and appearance-based models for object classification use two types of image features of an object in an image, histogram of gradients (HOG) for representing shapes of the object and a pyramid histogram of visual words (PHOW) for representing appearance of the object. The HOG features and PHOW features of an image are automatically computed from the image in a pre-processing step. The part-based object models correspond to HOG bundles of the object contained in the image, which are grouping of HOG features of objects in digital images. The HOG-bundles of an object in an image typically correspond to parts of the object and the part-based object models can be used to parse the object into parts. Thus, the part-based object models are also referred to as "shape models" herein. The global appearance of the object is modeled by histograms of vector quantized PHOW features of the object. Overall, the HOG bundles, supplemented by PHOW features defined within an object bounding box, provide a rich and intuitive representation of the appearance of the object.

Turning now to FIG. 1, FIG. 1 illustrates a computer system 100 for learning and applying part-based object models according to one embodiment of the invention. The computer system 100 comprises a memory 120, an input controller 130, an output controller 140, a processor 150 and a data store 160. In one embodiment, the computer system 100 is configured to receive an image training set 110A for learning part-based object models 124 and appearance-based models 126 from the image training set 110A. The computer system 100 is further configured to receive an input image 110B and applies the learned part-based object models 124 and the appearance-based model 126 to the input image 110B at runtime.

The image training set 110A comprises multiple pre-labeled images of various categories of objects. In one embodiment, the image training set 110A comprises a dataset of five object categories: APPLE™ logs, bottles, giraffes, mugs and swans, with a total of 255 images in various orientations and viewpoints. Another two datasets of the image training set 110A contain various images of horses and cars in multiple viewpoints. Other embodiments of the image training set 110A can have different pre-labeled images of objects. The pre-labeled images of the image training set 110A provide ground truth for the object classification problem to be solved by the disclosed method/system.

The memory 120 stores data and/or instructions that may be executed by the processor 150. The instructions may comprise computer program code for performing any and/or all of the techniques described herein. The memory 120 may be a DRAM device, a static random access memory (SRAM), Flash RAM (non-volatile storage), combinations of the above, or some other memory device known in the art. In one embodiment, the memory 120 comprises an image pre-processing module 122, part-based object models 124 and appearance-based models 126.

The image pre-processing module 122 extracts image features (e.g., shape features and appearance features) of the objects in an image from the images in the image training set 110A. The part-based object models 124 and the appearance-based models 126 are learned from the image training set 110A at learning phase based on the extracted image features and are stored in the data store 128. The learned part-based object models 124 and the appearance-based models 126 are applied to the input image 110B at runtime to classify the objects contained in the input image 110B. The image pre-processing module 122, the part-based object models 124 and appearance-based models 126 are further described below with reference to FIG. 3-FIG. 6.

Figure 2A:
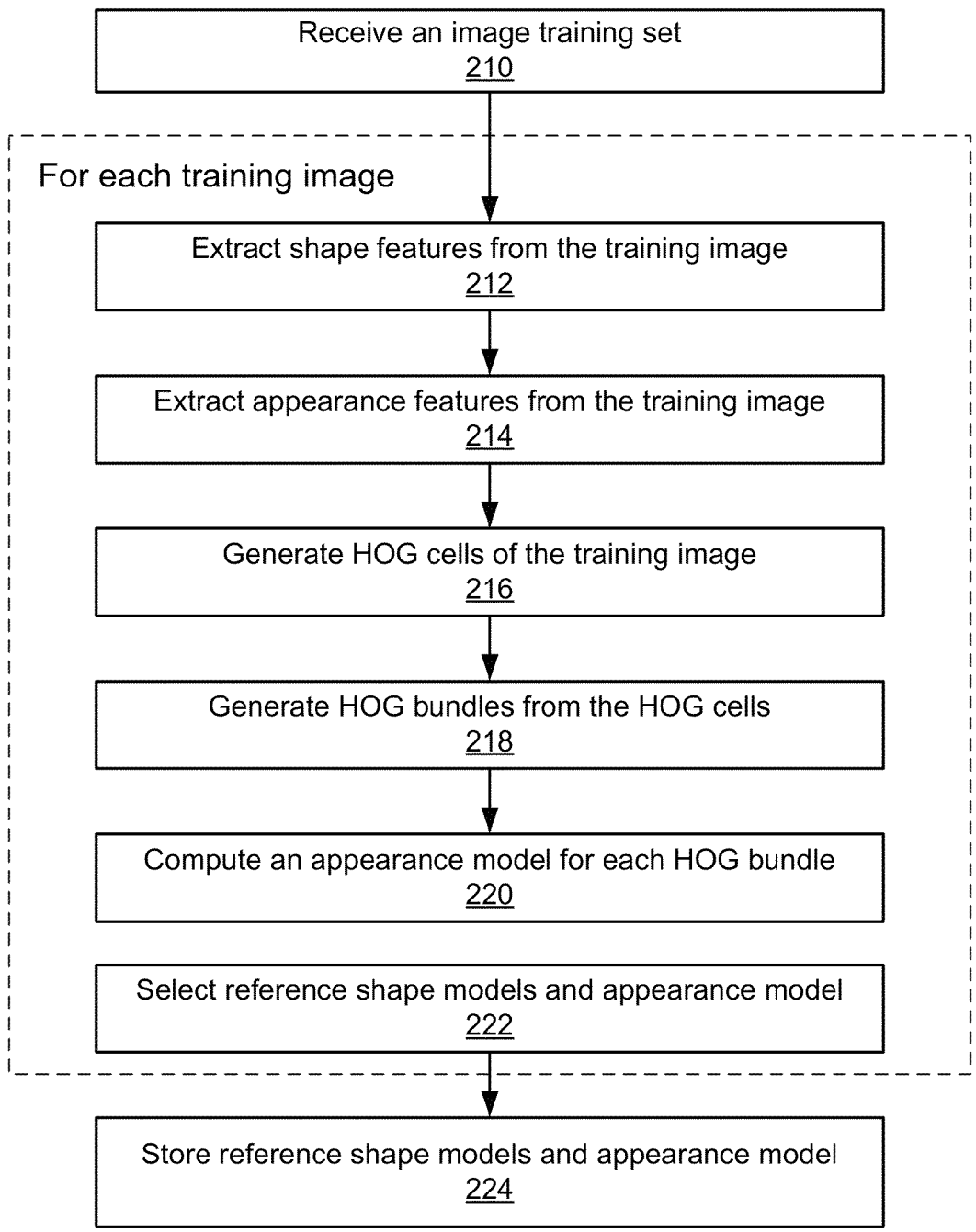
FIG. 2A is a system level flowchart of learning part-based object models during learning phase according to one embodiment of the invention.

FIG. 2A is a system level flowchart of learning part-based object models 124 during learning phase according to one embodiment of the invention. Initially, the computer system 100 receives 210 an image training set comprising multiple pre-labeled images of objects. For each training image of the image training set, the computer system 100 extracts 212 shape features (also called "HOG features") from the training image and further extracts 214 appearance features from the training image. One way to extract HOG features is described in N. Dalal, al. "Histograms of oriented gradients for human detection," *IEEE Conf. on Computer Vision ant Pattern Recognition*. 2005, which is incorporated by reference in its entirety. From the extracted shape features, the computer system 100 generates 216 HOG cells of the training image and generates 218 HOG bundles from the HOG cells. For each HOG bundle, the computer system 100 computes 220 an appearance model. The computer system 100 selects 222 one or more reference shape models from the HOG bundles as the learned part-based object models of the object and at least one appearance model as a global appearance model of the object and stores 224 the selected models for runtime application.

Figure 2B:
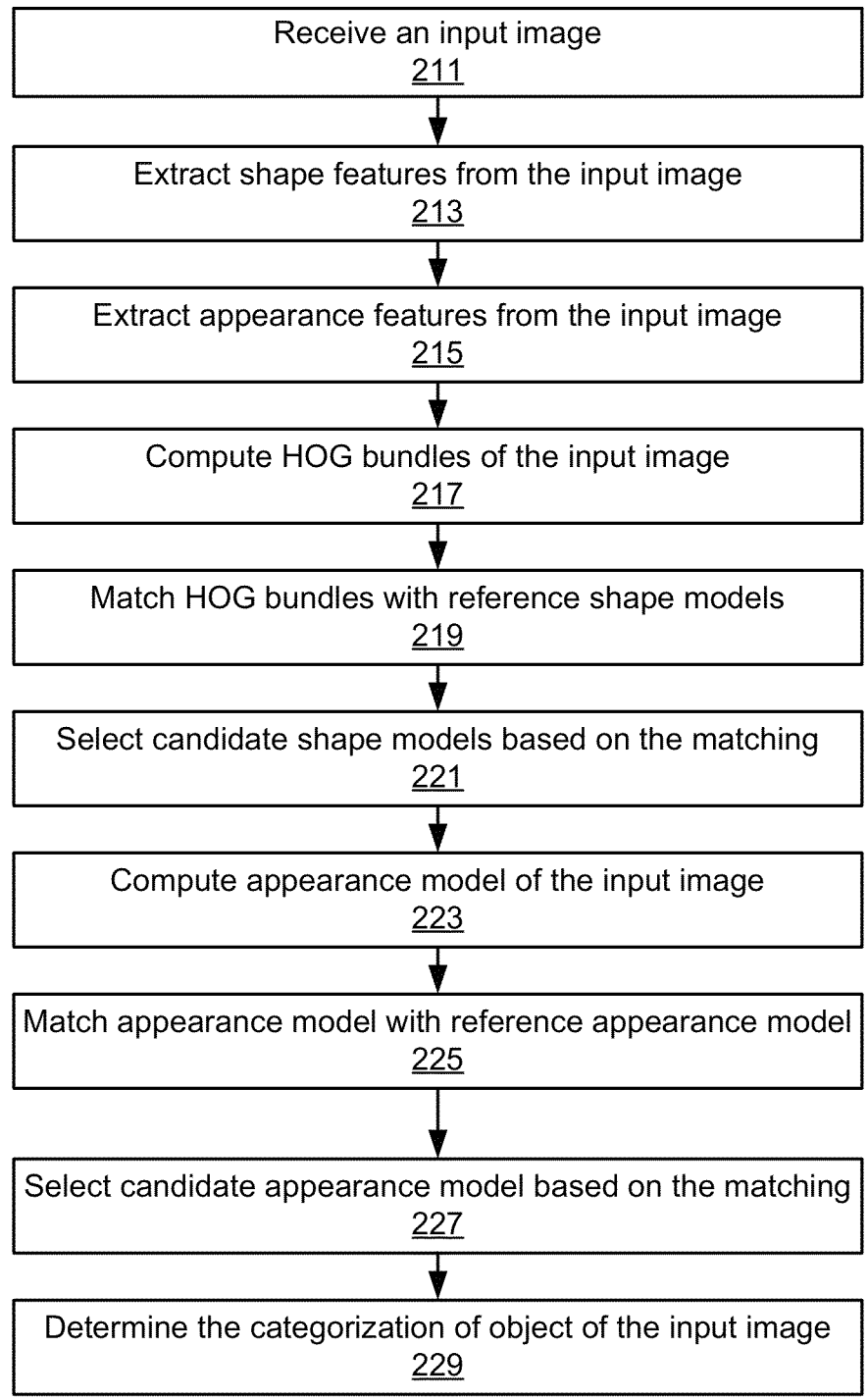
FIG. 2B is a system level flowchart of applying learned part-based object models to an input image at runtime according to one embodiment of the invention.

FIG. 2B is a system level flowchart of applying learned part-based object models to an input image at runtime according to one embodiment of the invention. At runtime, the computer system 100 receives 211 an input image, which contains one or more objects for object classification, and extracts 213 the shape features and appearance feature (step 215) from the input image. The computer system 100 computes 217 HOG bundles of the input image and matches 219 the computed HOG bundles with the reference shape models. The computer system 100 selects 221 one or more candidate shape models based on the matching. The computer system 100 further computes 223 an appearance model of the input image and matches 225 the computed appearance model with the global appearance model. Based on the matching, the computer system 100 selects 227 a candidate appearance model for the input image. From the selected candidate shape models and appearance model, the computer system 100 determines 229 the classification of the object in the input image.

Figure 3:
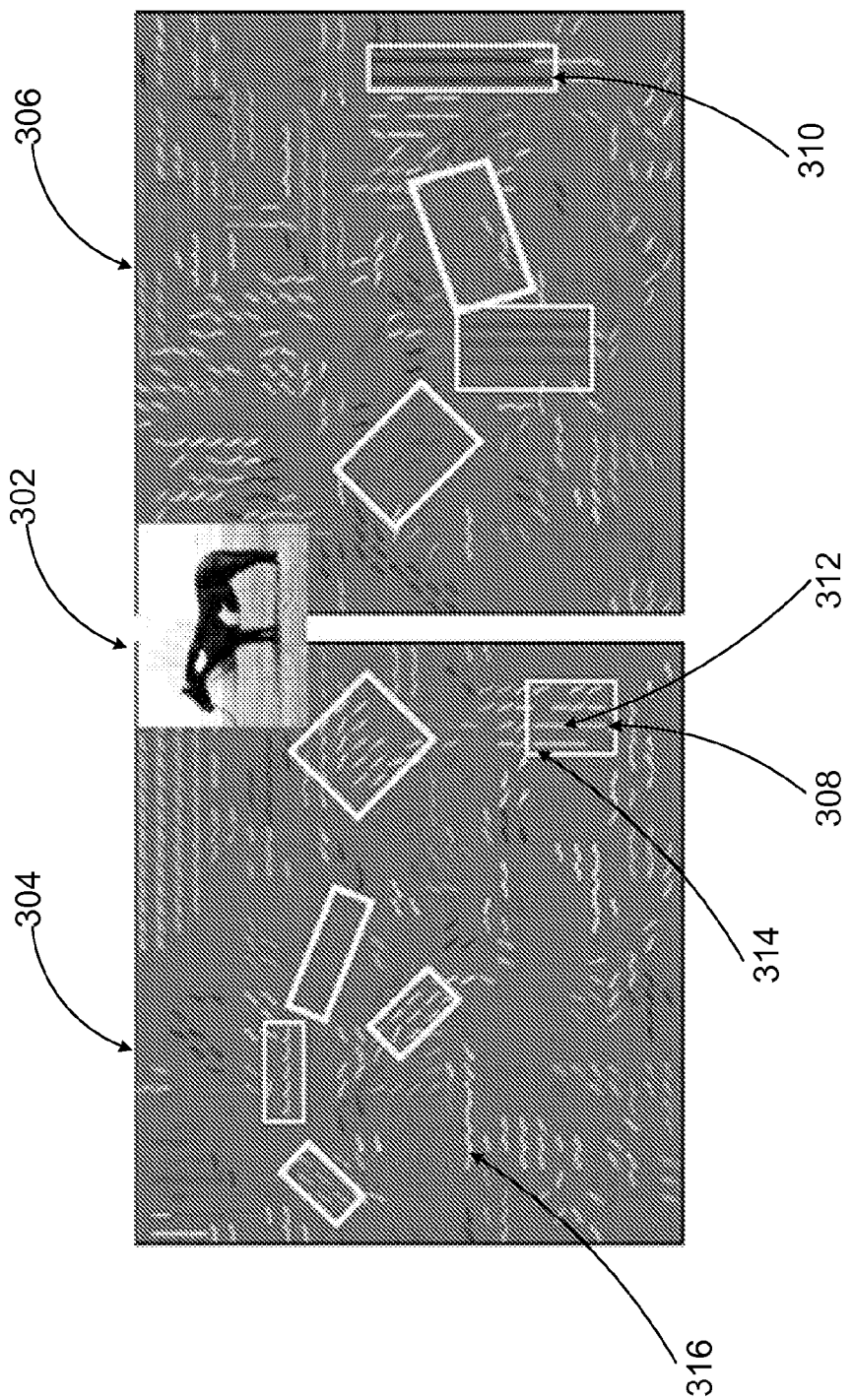
FIG. 3 is an example image with learned part-based models in a left-to-right orientation and a right-to-left orientation.

FIG. 3 is an example image with learned part-based models 124 in a left-to-right orientation and a right-to-left orientation. The input image 302 contains a horse as the object to be classified. The shape of the horse is represented by multiple HOG boundless generated by the computer system 100, e.g., the rectangles 308 and 310. The HOG bundles in the left image 304 correspond to the gradients with an example left-to-right orientation of the horse. The HOG bundles (e.g., the rectangles) in the right image 306 correspond to the gradients with an example right-to-left orientation of the horse. The gradients in the left image 304 and in the right image 306 are described by two different parts of a shape feature vector of the horse.

The computer system 100 extracts the HOG features of the horse from the image 302 and generates HOG cells, e.g., 312, 314 and 316, corresponding to the generated HOG features. Neighboring HOG cells sharing similar properties are grouped together to generate HOG bundles. For example, the HOG bundle 308 includes HOG cells 312, 314 and other similar HOG cells. The line of a HOG cell shows the dominant orientation of the cell.

Image Features—Hog Bundles and Phow Features

Two types of image features of an object are used for learning the part-based object models 124 and appearance-based models 126: HOGs for representing shapes of the object and PHOW for representing appearance of the object. The image pre-processing module 122 computes the HOG features and PHOW features of an image. The HOG features capture the object contours and uniform gradient regions on the object to be recognized in the image. The global appearance of the object is modeled by histograms of vector quantized PHOW features of the image. One way to compute PHOW features is described in A, Bosch, al. "Image classification using random forests and ferns," *Prof. of the Int'l Conf. on Computer Vision*. 2007, which is incorporated by reference in its entirety.

The part-based object models 124 use HOG bundles because HOG bundles are robust to local variations in shape and image intensity of an object in an image. HOG bundles also provide a richer description of the object than interest points, which are often used to capture the salient structures of the object. Moreover, compared to features such as the edge features of an object, there are advantages to using HOG bundles for learning objects because: (i) each HOG bundle has distinguishing attributes (e.g., size, height and width), and (ii) there are only a limited number HOG bundles (e.g., a few hundred of HOG bundles) in an image.

In one embodiment, an image I is represented by I={$z_i$: i=1, ..., N} in terms of HOG bundles, where a HOG bundle is described by z=(r, θ, f), r is the position of the bundle, θ is the orientation of the bundle, and f=($f_h, f_w$) is the height $f_h$ and width $f_w$ of the bundle. The number of HOG bundles in an image is denoted by N. The HOG bundles z=(r, θ, f) can be augmented by the appearance-based models, e.g., by PHOW features Ph(r) as a function of position r.

In one embodiment, the image pre-processing module 122 computes the HOG features of an image (e.g., step 212 of FIG. 2A), where the orientations of the HOG features are quantized into 18 bins, resulting in a 31-dimensional feature vector for each HOG cell. Each pixel of the image can have a corresponding HOG cell, but practically, the image pre-processing module 122 computes a HOG cell for multiple pixels, e.g., every 8×8 pixels of the image, and the image pre-processing module 122 may computes a HOG cell for every 8×8 pixels in horizontal orientation and another HOG cell for the 8×8 pixels in vertical orientation.

The image pre-processing module 122 generates HOG bundles by grouping neighboring HOG cells which share similar properties, In one embodiment, the image pre-processing module 122 groups two HOG cells if the two HOG cells are neighbors in the image and satisfy the following grouping criteria:

(i) The difference between feature vectors of the two HOG cells is small, where the distance is computed by a chi square ($x^2$) distance function over the feature vectors;

(ii) The orientation (e.g., horizontal or vertical) with the maximum magnitude is similar between the two HOG cells. Generally, the HOG cells that belong to a part of an object have a similar orientation among each other; and (iii) HOG cells with orientation in many directions are not be grouped because they usually correspond to randomly textured areas such as grass. This criterion is quantified by the squared difference $|\Omega - w|^2$, where $\Omega$ is the maximum magnitude of the orientation part of the feature vector, and w is the mean of the magnitudes. The image pre-processing module 122 groups the HOG cells that correspond to uniform intensity regions (i.e., low-magnitude gradient cells).

The image pre-processing module 122 builds a HOG-bundle from an arbitrary HOG cell in the image and checks whether the HOG cell's neighboring HOG cells satisfy the grouping criteria described above. If the neighboring HOG cells meet the grouping criteria, the image pre-processing module 122 groups them. The image pre-processing module 122 repeats the checking of all neighboring HOG cells for grouping until all of the HOG cells in the image are processed. Each HOG bundle has the following attributes: position of the center (r) of the HOG bundle, width ($f_w$), height ($f_h$), and orientation (θ) of the HOG bundle, which is the mean of the orientations with the maximum magnitude in the histograms of the HOG cells grouped in the HOG bundle.

In addition to extracting HOG features from an input image, the image pre-processing module 122 also extracts PHOW features (e.g., step 214 of FIG. 2A) to model the global appearance of the object contained in the input image. In one embodiment, the PHOW features are a variant of scale-invariant feature transform (SIFT) features computed at multiple scales on the image containing the object. SIFT is a way to detect and describe local features in an image by detecting multiple feature description key points of an object in an image. The global appearance of the object is modeled by histograms of vector quantized PHOW features of the object. The PHOW features are denoted as Ph(r), which are computed densely as a function of position r of a corresponding HOG bundle. Within any image window, the histogram of the PHOW feature, $\mathcal{H}$ (Ph(.)), can be computed using a standard clustering technique, e.g., quantizing the PHOW features using K-means to create a codebook/dictionary of code words of a pre-specified size.

Part-Based Object Models—the Object Models

Figure 4:
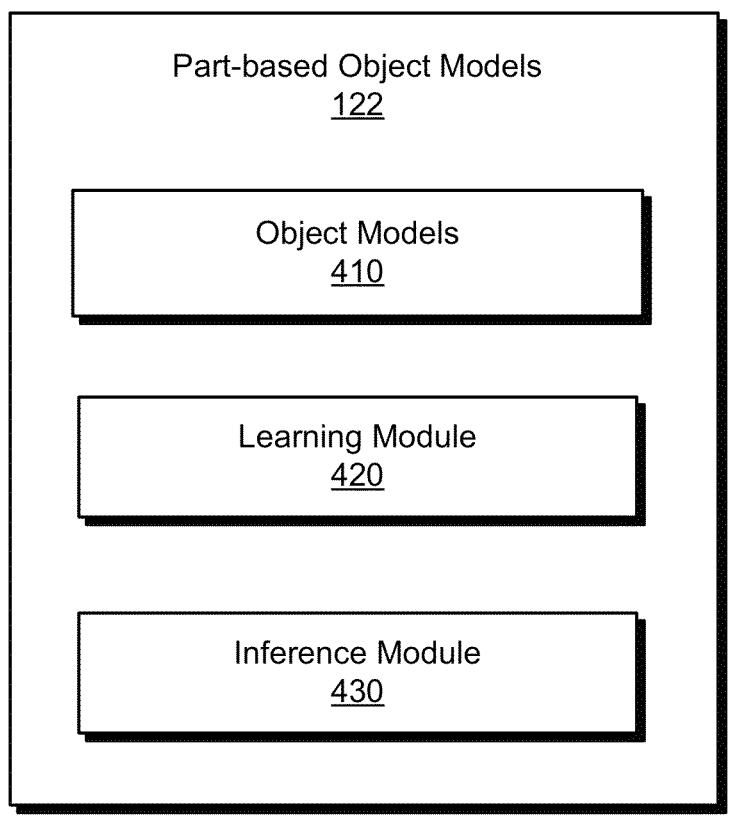
FIG. 4 illustrates functional modules of part-based object models according to one embodiment of the invention.

FIG. 4 illustrates functional modules of part-based object models 124 according to one embodiment of the invention. In the embodiment illustrated in FIG. 4, the part-based object models 124 have one or more object models 410 to represent shapes of objects, a learning module 420 to learn the object models during a learning phase from training images and an inference module 430 to apply the learned object models to an input image at runtime.

In one embodiment, the part-based model of an object is a graphical model with state variables W={$w_i$: i=1, ..., M}, where $w_i$=($r_i$, $\theta_i$, $f_i$) represents the $i^{th}$ part of the object, which has a position parameter $r_i$, which is the center of a corresponding HOG bundle, the orientation $\theta_i$, and the feature properties $f_i$ of corresponding HOG bundle. The feature properties can be decomposed into f=($f_w$,$f_h$), where $f_w$ and $f_h$ describe the width and height of the HOG-bundle. FIG. 5A visualizes HOG bundles of the horse illustrated in FIG. 3. For example, HOG bundle 502 represents a part of the horse. The HOG bundle 504 is a reference HOG bundle used in learning the part-based object models of the horse, where $\phi_1$ is the orientation of the reference HOG bundle 504 and $f_{h1}$ is the height of the reference HOG bundle 504. In one embodiment, the reference HOG bundle 504 is randomly selected from the multiple HOG bundles of the object.

Figure 5B:
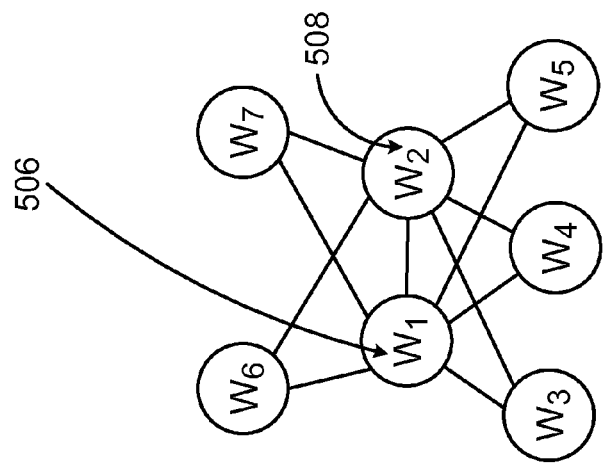
FIG. 5B is a corresponding graph representation of references of the part-based object models illustrated in FIG. 5A.
Figure 5A:
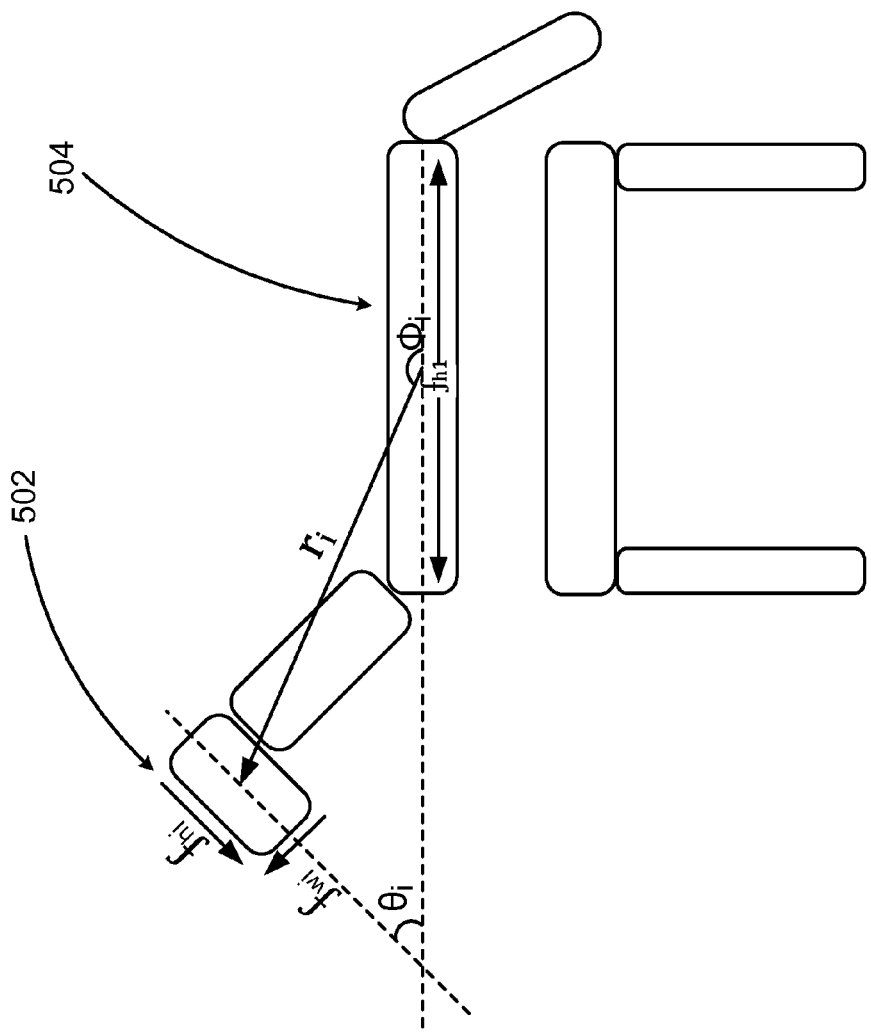
FIG. 5A is an example representation of the part-based object models of the input image illustrated in FIG. 3.

FIG. 5B is a corresponding graphical model for the horse object illustrated in FIG. 5A. State variable $w_1$ 506 corresponds to the reference HOG bundle 504 and state variable $w_2$ 508 corresponds to another reference HOG bundle. Probabilistic modeling of the part-based models uses the specification of a prior distribution on the part-based models and a likelihood function for the probabilistic modeling. In one embodiment, the prior distribution on the part-based models is represented by Equation (1) below:

$$P(W|\Lambda) = P(w_1)P(w_2|w_1, \lambda_2)\prod_{i=3}^{M} P(w_i|w_1, w_2, \lambda_i), \quad (1)$$

where $w_1$ and $w_2$ are the reference HOG bundles and the part-based model parameters $\Lambda=(\lambda_2, \ldots, \lambda_M)$, and the number of parts M are learned from image training data described below with reference to the description of the learning module 420. The form of the model enables efficient inference, invariant to scale and in-plane rotation, as discussed below with reference to the description of the inference module 430

The probability distributions of Equation (1) are specified as follows: ($r_i$−$r_1$)=$r_i$(cos $\phi_i$, sin $\phi_i$) specifies a coordinate change in radial coordinates based on the position $r_1$ of the first part (i.e., the first reference HOG bundle $w_1$). P($w_1$) is the uniform distribution U($w_1$). It is assumed that the spatial and feature terms are independent as the following:

$$P(w_i|w_1,w_2)=P(f_i|f_{h1})P(\phi_i|\phi_1)P(\theta_i|\phi_1)P(r_i|r_1,r_2)$$

$$P(w_2|w_1)=P(f_2|f_{h1})P(\phi_2|\phi_1)P(\theta_2|\theta_1)P(r_2|r_1), \quad (2)$$

where $f_{h1}$ represents the height of the first reference HOG bundle $w_1$.

The probability distributions of Equation (1) are further defined in terms of Gaussian and uniform distribution as in Equation (3) below, using the notation that N(μ, $\sigma^2$) is a Gaussian distribution with mean μ and variance $\sigma^2$. The distributions are chosen to ensure invariance to the scale of the features, the orientation of the object, and the scale of the object. It is noted that in an embodiment features sizes and orientations are defined relative to those of the first reference HOG bundle, and the relative positions are scaled by the distances between the two HOG reference bundles $w_1$ and $w_2$.

$$P(f_i|f_1)=N(f_{h1}\mu_i^f,f_{h1}^2\sigma_f^2),P(\phi_i|\phi_1)=N(\mu_i^\phi+\phi_1,\sigma_\phi^2)$$

$$P(\theta_i|\phi_1)=N(\mu_i^\theta+\phi_1,\sigma_\theta^2),P(r_i|r_1,r_2)=N(r_2\mu_i^r,r_2^2\sigma_r^2),$$

$$P(r_2|r_1)=U(r_2). \quad (3)$$

The part-based model parameters are the mean features and angles {($\mu_i^f$,$\mu_i^\phi$,$\mu_i^\theta$), i=2, ... M} and positions $\mu_i^r$: i= 3, ... M. The part-based model parameters are learned from the image training data. There are an additional four parameters which are fixed $\sigma_f^2$, $\sigma_\phi^2$, $\sigma_\theta^2$, $\sigma_r^2$ in one embodiment.

The likelihood function assumes that the HOG bundles {$z_i$: i=1, ..., N} in an image are generated either from an object model P(I|W), or from a background model $P_B(z)$, which generates HOG bundles independently. The object model P(I|W) is defined as P(I|W)=$\prod_{i=1}^{M}\delta(z_i,w_i)$, where $\delta(z_i,w_i)$=1 if z=w, and equal to zero otherwise (i.e. the HOG bundles generated by the object model have the same features, positions, and orientations as the state variables w of the object parts). For simplicity, the background model is defined as the uniform distribution, i.e., $P_B(.)$=U(.). Thus, the likelihood function for an image assumes that $z_i$: i=1, ..., M sampled from P(I|W)P(W)

$z_i$: i=M+1, ..., N sampled from $P_B(z)$. (4)

Part-Based Object Models—Object Inference

The inference module 430 is for determining whether there is an object in an input image at runtime and if the determination indicates there is an object, the inference module 430 determines the location of the object in the input image. In one embodiment, each object O can have several different part-based models indexed by τ. The probabilities of the part-based models are expressed as P(W|O, τ), which is of the form given by Equation (1) with parameters $\Lambda_{O,\tau}$, which depend on the object O and the object model $\tau$. It is assumed that all part based models for the same object have the same number of parts. The likelihood functions are the same for all part-based models as defined in Equation (4). There is a default background model for an image, which assumes that $P_B(I)=\Pi_{i=1}^{N}P_B(z_i)$, i.e. each HOG bundle is generated independently by $P_B(.)$, where N is the number of HOG bundles in the image.

There are two types of inference tasks for the inference module 430. The first task is to find whether the image contains an object, and if so, to determine the object label and object type. The second task is to determine where the object is in the image, i.e. to determine the configuration W of the object. Detecting the optimal configuration for each object and type O, $\tau$ can be done by solving Equation (5) below:

$$\hat{W}_{O,\tau} = {}_W^{arg\ max} P(I|W)P(W|O,\tau). \quad (5)$$

The form of the likelihood function defined in Equation (4) means that the state variables $\{w_i: i=1, \ldots M\}$ can only take values $\{z_i: i=1, \ldots N\}$ from the HOG bundles computed from the input image. The form of the part-based models defined in Equation (1) means that it can be expressed as minimizing a function of form $E(w_1, w_2)+E(w_1, w_2, w_3)+ \ldots +E(w_1, w_2, w_M)$, which can be performed in polynomial time. $E(.)$ is the negative logarithm of the probability, thus is a sum of quadratic terms if the distributions are Gaussian.

In one embodiment, the inference module 430 determines which object, if any, is present in the input image and type of the object based on part-based object model selection. The object and its type $(O_i, \tau_i)$ are calculated such that:

$$P(I|\hat{W}_{O,\tau})P(\hat{W}_{O,\tau}|O,\tau) > P(I), \quad (6)$$

Generally, the part-based model selection should sum over all possible configurations of the object models but, in practice, the locations are often strongly peaked so that the inference module 430 can replace the sum by the dominant term of the part-based object models. In one embodiment, $P_B(.)$ is a constant and the part-based model selection selects only model configurations for which the probability $P(I|W)P(W|O,\tau)$ lies above a predetermined threshold.

Each input image has a set of n part-based models and types $(O_i, \tau_i)$ together with the associated configurations $\hat{W}_{O_1\tau_1}, \ldots, \hat{W}_{O_n\tau_n}$, which indicates possible classifications of the object and possible detection of locations of the object. If n=0, no object is detected. The selected part-based models are candidate object models and the candidate object models and their associated configurations are then combined with the results of the learned appearance-based model for final determination of the presence and location of the object in the input image.

Part-Based Object Models—Learning the Object Models

The learning module 420 of the part-based object models 122 learns the part-based object models from image training data during the learning phase. The part-based object models learning is supervised based on the known object bounding box and object labels of the image training data (without knowing the object viewpoint data). The part-based models are learned by searching over the space of all object models to minimize the error over the training data using a set of learning rules. In one embodiment, the object model selection procedure is done separately for each object contained in an image.

The input to the object model selection procedure is a set of images, where each image is composed of a set of HOG-bundles. The learning procedure finds a probability distribution over the combination of HOG-bundles. The state of each part in the model is computed relative to the state of the two reference parts. The learning module 420 repeats the selection until it fails to generate object models with more parts. The learning procedure also stops in the case that at least one of the training images is not described by the newly created object models. A single set of parameters is learned for all of the similar combinations of HOG-bundles. Therefore, there are a different set of parameters for each model.

The object models grow by including more parts until no more parts can be added. The object model selection produces a set of reference part-based models for each object. For objects viewed from different viewpoints, the selection includes part-based models capturing each viewpoint. The learning module 420 prunes the set of reference object models based on two additional criteria: (i) removing those reference object models whose bounding boxes are significantly smaller than the bounding boxes of the training data, and (ii) eliminating the reference object models which occur least frequently in the training images.

Figure 6:
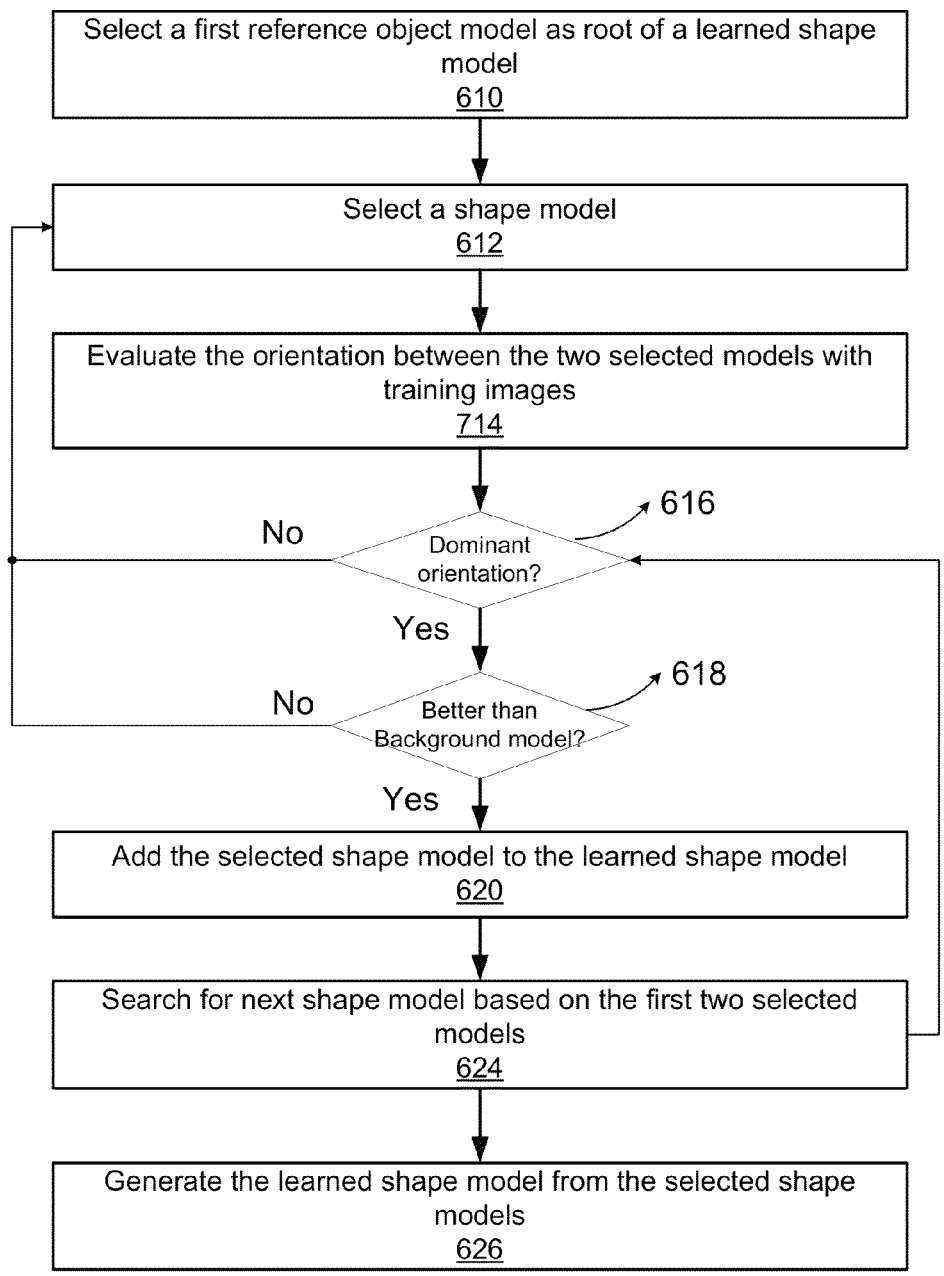
FIG. 6 is a flowchart of learning part-based object models during learning phase according to one embodiment of the invention.

FIG. 6 is a flowchart of learning part-based object models by the learning module 420 during learning phase according to one embodiment of the invention. Initially, the learning module 420 selects 610 a first reference object model as the root of a learned shape model (i.e., part-based object model) and selects 612 a new shape model. The learning module 420 evaluates 614 the orientation between the root object model and selected shape model with a set of training images. If the orientation is not a dominant orientation among the training images at step 616, the learning module goes back to step 612 to select another shape model for evaluation.

If the orientation is a dominant orientation among the training images at step 616, the learning module 420 determines 618 whether the selected shape model with the root model provide a better description of the object than a background object model. If the determination at step 618 indicates that the selection provides a better description of the object than the background object model, the learning module 420 adds 620 the selected shape model to the learned shape model. If the determination at step 618 indicates that the selection does not provide a better description of the object than the background object model, the learning module 420 adds 620 goes back to step 612 to select another shape model. The learning module 420 searches 624 for next shape model based on the first two selected shape models and repeats steps 616-620 for the next shape model. From the selected shape models, the learning module 420 generates 626 the learned shape model of the object.

The Appearance-Based Model

The part-based object models described above can be further enhanced by additional appearance cues specified by the appearance-based models because the part-based object models only use appearance cues that can be represented by HOG-bundles. These correspond to dominant edges of the objects and, sometimes, regions of constant intensity. Hence, the part-based object models for object classification can be improved when dealing with regional appearance cues.

The appearance-based models 126 illustrated in FIG. 1 are configured to augment the part-based object models 124 with additional cues which are sensitive to regional properties of the objects. Each part-based object model has a corresponding appearance-based model. The augmentation corresponds to supplementing the HOG bundles with the additional PHOW features so that $I=(\{z_i\}, Ph(r))$, where $Ph(r)$ are the PHOW features. This introduces a new appearance variable $w_A$ for a part-based object model, which corresponds to the region occupied by the object. In addition, a new likelihood term is added, which couples the appearance variable to the histograms of PHOWs $\mathcal{H}$(Ph(.)) computed in the corresponding image region:

$$P((Ph(.))\,|\,w_A, O, \tau) = \frac{1}{2}\exp\left\{-\min_{a}\mathcal{M}(\mathcal{H}\,(Ph(.)), \mathcal{H}_a^{O,\tau})\right\}, \quad (7)$$

where $\mathcal{M}(.,.)$ is a measure of similarity between the histogram $\mathcal{H}$(Ph(.)) computed in the image region $w_A$ and the histogram of one of several prototype histograms $\mathcal{H}_a^{O,r}$ indexed by a for the object label and object type O, r.

In one embodiment, the prototypes histograms $\mathcal{H}_a^{O,r}$ are the histograms of the regions in training images surrounded by object bounding boxes. The appearance-based model for its corresponding part-based object model chooses the nearest prototype using a min operation at the learning phase using training images. The appearance-based object model assumes a default distribution P ($\mathcal{H}$(Ph(.))) to be uniform in regions where the object is not present. In one embodiment, the appearance-based model 126 specifies $w_A$ (W) to be a deterministic function, e.g. bounding box, of the state variables W estimated for the corresponding part-based object model.

During inference for an input image at runtime, the appearance-based model 126 estimates $\hat{W}_{O,r}$ for each object type O, r by Equation (5) of its corresponding part-based object model 124. The appearance-based model 126 computes $w_A$ ($\hat{W}_{O,r}$) to obtain the position of the bounding box of the object, followed by computing the overall fitness score for the object type by combining the contributions from the part-based object model and the appearance model.

The augmentation of a part-based object model by its corresponding appearance-based model can be further improved by, for example, learning the relationship between the appearance variable $w_A$ and its part-based variables W, estimating the variables W and $w_A$ simultaneously at runtime, and computing the normalization term when combining the part-based object model and the appearance cues.

Embodiments of the invention provide a solution to the object classification problem based on learning part-based models for objects in a variety of object categories. The learned part-based object models are augmented by appearance-based models of the objects. The learning process uses limited number of positive examples of each object category and is supervised based on the knowledge of the object labels and bounding box of the pre-labeled objects during learning. The learning part-based object models has the capability of learning object models without using viewpoint labels of the objects. The learning is also invariant to scale and in-plane rotation of the objects.

While particular embodiments and applications of the invention have been illustrated and described herein, it is to be understood that the invention is not limited to the precise construction and components disclosed herein and that various modifications, changes, and variations may be made in the arrangement, operation, and details of the methods and apparatuses of the invention without departing from the spirit and scope of the invention as it is defined in the appended claims.

What is claimed is:

1. A computer implemented method for learning part-based object models from a set of digital representations of images, the method comprising:
   receiving a set of digital representations of images, each image having at least one object;
   for each image:
      extracting one or more shape features from the image;
      extracting one or more appearance features from the image;
      generating one or more shape models of the object based on the shape features, a shape model corresponding to a part of the object, generating a shape model of the object comprising:
         generating one or more histogram of oriented gradient (HOG) cells for a number of pixel of the image; and
         grouping two or more HOG cells into a HOG bundle based on similarity of orientations of the HOG cells with respect to the maximum magnitude of orientations of the HOG cells;
      computing an appearance model for each shape model of the object based on the appearance features;
      selecting one or more shape models as reference shape models of the object;
      selecting one or more appearance models as reference appearance models of the object; and
   storing the reference shape models of the images; and
   storing the reference appearance models of the images.

2. The method of claim 1, wherein generating a shape model of the object further comprises:
   grouping two or more HOG cells into a HOG bundle based on distance between two HOG cells, wherein the distance between the HOG cells is measured by a distance function.

3. The method of claim 1, wherein a HOG bundle is described by position of the bundle, orientation of the bundle, height and width of the bundle.

4. The method of claim 1, wherein selecting one or more shape models of the object comprises:
   computing probability distributions of the shape models of the object; and
   estimating likelihood of each shape model to be selected as a reference shape model of the object.

5. The method of claim 4, further comprising:
   re-computing the probability distribution of each shape model based on the appearance features contained in a corresponding appearance model.

6. The method of claim 1, wherein selecting one or more shape models of the object further comprises:
   selecting a first shape model from the shape models of the object as a root shape model of the object;
   selecting a second shape model from the shape models of the object;
   applying one or more learning rules to the second shape model;
   determining whether the first shape model and the second shape model provide a better description of data for classifying the object than a background model; and
   generating a shape model comprising the root shape model and the second shape model for the object.

7. The method of claim 1, wherein generating a shape model further comprises:
   grouping two or more HOG cells into a HOG bundle based on distance between the HOG cells measured by a chi square distance function and similarity of orientations of the HOG cells with respect to the maximum magnitude of orientations of the HOG cells.

8. The method of claim 1, wherein generating a shape model further comprises:
   comparing orientation of a HOG cell with a predefined orientation threshold; and
   excluding the HOG cell from grouping with other HOG cells responsive to the evaluation of the difference between the orientation of the HOG cell and the predefined orientation threshold.

9. A computer system for learning part-based object models from a set of digital representations of images, the system comprising:
  a non-transitory computer-readable storage medium storing executable computer program instructions; and
  a computer processor executing the computer program instructions to perform steps comprising:
    receiving a set of digital representations of images, each image having at least one object; and
    for each image:
      extracting one or more shape features from the image;
      extracting one or more appearance features from the image;
      generating one or more shape models of the object based on the shape features, a shape model corresponding to a part of the object, generating a shape model comprising:
        generating one or more histogram of oriented gradient (HOG) cells for a number of pixel of the image; and
        grouping two or more HOG cells into a HOG bundle based on similarity of orientations of the HOG cells with respect to the maximum magnitude of orientations of the HOG cells;
      computing an appearance model for each shape model of the object based on the appearance features; and
      selecting one or more shape models as reference shape models of the object;
      selecting one or more appearance models as reference appearance models of the object; and
    storing the reference shape models of the images; and
    storing the reference appearance models of the images.

10. The system of claim 9, wherein generating a shape model of the object further comprises:
  grouping two or more HOG cells into a HOG bundle based on distance between two HOG cells, wherein the distance between the HOG cells is measured by a distance function.

11. The system of claim 9, wherein a HOG bundle is described by position of the bundle, orientation of the bundle, height and width of the bundle.

12. The system of claim 9, wherein selecting one or more shape models of the object comprises:
  computing probability distributions of the shape models of the object; and
  estimating likelihood of each shape model to be selected as a reference shape model of the object.

13. The system of claim 12, further comprising:
  re-computing the probability distribution of each shape model based on the appearance features contained in a corresponding appearance model.

14. The system of claim 9, wherein selecting one or more shape models of the object further comprises:
  selecting a first shape model from the shape models of the object as a root shape model of the object;
  selecting a second shape model from the shape models of the object;
  applying one or more learning rules to the second shape model;
  determining whether the first shape model and the second shape model provide a better description of data for classifying the object than a background model; and
  generating a shape model comprising the root shape model and the second shape model for the object.

15. The system of claim 9, wherein generating a shape model further comprises:
  grouping two or more HOG cells into a HOG bundle based on distance between the HOG cells measured by a chi square distance function and similarity of orientations of the HOG cells with respect to the maximum magnitude of orientations of the HOG cells.

16. The system of claim 9, wherein generating a shape model further comprises:
  comparing orientation of a HOG cell with a predefined orientation threshold; and
  excluding the HOG cell from grouping with other HOG cells responsive to the evaluation of the difference between the orientation of the HOG cell and the predefined orientation threshold.

17. A non-transitory computer-readable storage medium storing executable computer program instructions for learning part-based object models from a set of digital representations of images, the computer program instructions comprising instructions for:
  receiving a set of digital representations of images, each image having at least one object;
  for each image:
    extracting one or more shape features from the image;
    extracting one or more appearance features from the image;
    generating one or more shape models of the object based on the shape features, a shape model corresponding to a part of the object, generating one or more shape models comprising:
      generating one or more histogram of oriented gradient (HOG) cells for a number of pixel of the image; and
      grouping two or more HOG cells into a HOG bundle based on similarity of orientations of the HOG cells with respect to the maximum magnitude of orientations of the HOG cells;
    computing an appearance model for each shape model of the object based on the appearance features;
    selecting one or more shape models as reference shape models of the object; and
    selecting one or more appearance models as reference appearance models of the object; and
  storing the reference shape models and appearance models of the images; and
  storing the reference appearance models of the images.

18. The computer-readable storage medium of claim 17, wherein the computer program instructions for selecting one or more shape models of the object comprise instructions for:
  computing probability distributions of the shape models of the object;
  estimating likelihood of each shape model to be selected as a reference shape model of the object; and
  re-computing the probability distribution of each shape model based on the appearance features contained in a corresponding appearance model.

19. The computer-readable storage medium of claim 17, wherein the computer program instructions for generating a shape model further comprise instructions for:
  grouping two or more HOG cells into a HOG bundle based on distance between the HOG cells measured by a chi square distance function and similarity of orientations of the HOG cells with respect to the maximum magnitude of orientations of the HOG cells.

20. The computer-readable storage medium of claim 17, wherein the computer program instructions for generating a shape model further comprise instructions for:

comparing orientation of a HOG cell with a predefined orientation threshold; and excluding the HOG cell from grouping with other HOG cells responsive to the evaluation of the difference between the orientation of the HOG cell and the predefined orientation threshold.

21. A computer implemented method for classifying an object contained in digital representation of an image, the method comprising:

receiving one or more reference shape models;

receiving one or more reference appearance models;

generating one or more shape models of the object based on shape features extracted from the image, a shape model corresponding to a part of the object, generating a shape model comprising:

generating one or more histogram of oriented gradient (HOG) cells for a number of pixel of the image; and grouping two or more HOG cells into a HOG bundle based on similarity of orientations of the HOG cells with respect to the maximum magnitude of orientations of the HOG cells;

comparing the generated shape models with the reference shape models;

selecting one or more candidate shape models of the object based on the comparison;

augmenting each candidate shape model with a corresponding appearance model of the object; and determining classification of the object based on the augmented candidate shape models.

22. The method of claim 21, wherein determining classification of the object comprises:

determining whether there is an object in the image based on the augmented candidate shape models; and responsive to the determination that there is an object in the image, determining location and type of the object.

23. A computer system for classifying an object contained in digital representation of an image, the system comprising:

a non-transitory computer-readable storage medium storing executable computer program instructions that when executed by a computer processor cause the computer processor to:

receive one or more reference shape models;

receive one or more reference appearance models;

generate one or more shape models of the object based on shape features extracted from the image, a shape model corresponding to a part of the object, generating a shape model comprising:

generating one or more histogram of oriented gradient (HOG) cells for a number of pixel of the image; and grouping two or more HOG cells into a HOG bundle based on similarity of orientations of the HOG cells with respect to the maximum magnitude of orientations of the HOG cells;

compare the generated shape models with the reference shape models;

select one or more candidate shape models of the object based on the comparison;

augment each candidate shape model with a corresponding appearance model of the object; and determine classification of the object based on the augmented candidate shape models.

24. The system of claim 23, wherein determining classification of the object comprises:

determining whether there is an object in the image based on the augmented candidate shape models; and responsive to the determination that there is an object in the image, determining location and type of the object.

25. A non-transitory computer-readable storage medium storing executable computer program instructions for classifying an object contained in digital representation of an image, the computer program instructions comprising instructions for:

receiving one or more reference shape models;

receiving one or more reference appearance models;

generating one or more shape models of the object based on shape features extracted from the image, a shape model corresponding to a part of the object, generating one or more shape models comprising:

generating one or more histogram of oriented gradient (HOG) cells for a number of pixel of the image; and grouping two or more HOG cells into a HOG bundle based on similarity of orientations of the HOG cells with respect to the maximum magnitude of orientations of the HOG cells;

comparing the generated shape models with the reference shape models;

selecting one or more candidate shape models of the object based on the comparison;

augmenting each candidate shape model with a corresponding appearance model of the object; and determining classification of the object based on the augmented candidate shape models.

26. The computer-readable storage medium of claim 25, wherein the computer program instructions for determining classification of the object comprise instructions for:

determining whether there is an object in the image based on the augmented candidate shape models; and responsive to the determination that there is an object in the image, determining location and type of the object.

* * * * *